(12) United States Patent
Stickle et al.

(10) Patent No.: US 11,310,208 B1
(45) Date of Patent: Apr. 19, 2022

(54) SECURE TIME SERVICE

(71) Applicant: Amazon Technologies, Inc., Seattle, WA (US)

(72) Inventors: Thomas Charles Stickle, Saint James, NY (US); Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 530 days.

(21) Appl. No.: 15/853,556

(22) Filed: Dec. 22, 2017

Related U.S. Application Data

(63) Continuation of application No. 13/866,768, filed on Apr. 19, 2013, now Pat. No. 9,853,949.

(51) Int. Cl.
*H04L 29/06* (2006.01)
*G06F 1/12* (2006.01)
*H04L 9/32* (2006.01)

(52) U.S. Cl.
CPC ............ *H04L 63/0428* (2013.01); *G06F 1/12* (2013.01); *G06F 2221/2151* (2013.01); *H04L 9/3297* (2013.01)

(58) Field of Classification Search
CPC ..... H04L 63/0428; H04L 9/3297; G06F 1/12; G06F 2221/2151
See application file for complete search history.

(56) References Cited

U.S. PATENT DOCUMENTS

| | | | |
|---|---|---|---|
| 5,444,780 A | 8/1995 | Hartman, Jr. | |
| 5,500,897 A | 3/1996 | Hartman, Jr. | |
| 6,275,843 B1 | 8/2001 | Chorn | |
| 6,438,702 B1 | 8/2002 | Hodge | |
| 7,072,967 B1 | 7/2006 | Saulpaugh et al. | |
| 7,334,014 B2 | 2/2008 | Moser et al. | |
| 7,873,024 B2 | 1/2011 | Fenwick et al. | |
| 8,122,154 B2 | 2/2012 | Ogawa et al. | |
| 8,220,031 B2 | 7/2012 | Leterrier et al. | |
| 8,392,709 B1 | 3/2013 | Agrawal | |
| 8,571,471 B2 | 10/2013 | Kuenzi et al. | |
| 8,813,225 B1 | 8/2014 | Fuller et al. | |
| 8,881,974 B2 | 11/2014 | Dischamp et al. | |
| 9,853,949 B1 | 12/2017 | Stickle et al. | |
| 2004/0242331 A1 | 12/2004 | Blackburn et al. | |

(Continued)

OTHER PUBLICATIONS

Mills, "Simple Network Time Protocol (SNTP) Version 4 for IPv4, IPv6 and OSI", Jan. 2006, obtained from https://datatracker.ietf.org/doc/html/rfc4330.*

(Continued)

*Primary Examiner* — Ashokkumar B Patel
*Assistant Examiner* — Forrest L Carey
(74) *Attorney, Agent, or Firm* — Robert C. Kowert; Kowert, Hood, Munyon, Rankin & Goetzel, P.C.

(57) ABSTRACT

Methods and apparatus for a secure time service are disclosed. A time server including a time source, a cryptographic key and a cryptographic engine is instantiated within a provider network. A time service endpoint receives a timestamp request from a client. The endpoint transmits a representation of the request to the time server, and receives, from the time server, an encryption of at least a timestamp generated using the time source. A response comprising the encryption of at least the timestamp is transmitted to the requesting client.

20 Claims, 9 Drawing Sheets

(56) References Cited

U.S. PATENT DOCUMENTS

| | | | |
|---|---|---|---|
| 2005/0232426 A1* | 10/2005 | Konersmann | H04L 63/0428 380/277 |
| 2007/0266256 A1 | 11/2007 | Shah et al. | |
| 2007/0268938 A1 | 11/2007 | Dowd | |
| 2008/0094211 A1* | 4/2008 | Teller | G06Q 20/203 340/540 |
| 2009/0006868 A1* | 1/2009 | Alkove | G06F 21/10 713/193 |
| 2009/0083372 A1* | 3/2009 | Teppler | H04L 9/3226 709/203 |
| 2011/0047292 A1 | 2/2011 | Gould et al. | |
| 2011/0185063 A1* | 7/2011 | Head | G06F 9/5077 709/226 |
| 2011/0289002 A1* | 11/2011 | Pazdziora | G06F 21/33 705/59 |
| 2011/0289140 A1 | 11/2011 | Pletter et al. | |
| 2012/0047239 A1 | 2/2012 | Donahue et al. | |
| 2012/0102479 A1 | 4/2012 | Smith et al. | |
| 2012/0166818 A1 | 6/2012 | Orsini et al. | |
| 2012/0210335 A1 | 8/2012 | Salt et al. | |
| 2012/0254674 A1 | 10/2012 | Kozakai et al. | |
| 2012/0330852 A1 | 12/2012 | Kochevar et al. | |
| 2013/0042103 A1* | 2/2013 | Deguchi | H04L 9/3297 713/156 |
| 2013/0185408 A1* | 7/2013 | Ngo | H04L 41/046 709/223 |
| 2013/0212420 A1 | 8/2013 | Lawson et al. | |
| 2013/0291062 A1* | 10/2013 | Bursell | G06F 21/44 726/4 |
| 2014/0115147 A1 | 4/2014 | de Assuncao et al. | |
| 2014/0245425 A1 | 8/2014 | Potlapally et al. | |

OTHER PUBLICATIONS

The American Heritage College Dictionary, 2002, Houghton Mifflin Company, 4th Edition, p. 719.

Fips Pub 140-3 "Security Requirements for Cryptographic Modules" Information Technology Laboratory, NIST, Sep. 11, 2009 pp. 1-63.

\* cited by examiner

SECURE TIME SERVICE

This application is a continuation of U.S. patent application Ser. No. 13/866,768, filed Apr. 19, 2013, now U.S. Pat. No. 9,853,949, which is hereby incorporated by reference herein in its entirety.

BACKGROUND

As more and more services migrate to the Internet, the security of network-accessible applications has become increasingly important. Many security mechanisms applicable to such applications rely on tamper-proof sources of time. For example, timestamps may be used for operations such as creating and verifying tokens, correlating audit trail records, or preventing replay attacks. In some distributed computing environments, audit log records across different servers of a distributed application may be correlated using the records' timestamps in order to help debug hard-to-resolve, often timing-dependent problems. An attacker that can skew the audit log timestamps may make such debugging much harder. Time-sensitive financial documents such as tax returns or stock trading records may also use trusted timestamps as evidence of the timing of financial transactions or events. Timestamps may also be included in digital signatures to prove the validity of documents that may not necessarily be timing-sensitive but nevertheless need to be secured against possible attacks.

Some traditional solutions for tamper-proof time sources involve the use of high-end hardware security appliances. Such appliances are often designed primarily for governmental agencies concerned with very high levels of security, such as defense-related or intelligence-related agencies, and may be extremely expensive. Customers of such appliances may often have to buy not just one, but multiple expensive appliances, e.g., to comply with requirements for continuity of operations and/or disaster recovery. In addition, even if a customer is willing to pay the price of acquiring multiple appliances, the customer may still have to solve the problem of securing the communications of the timestamps generated by the appliances with the servers or devices at which the timestamps are used.

Figure 1:
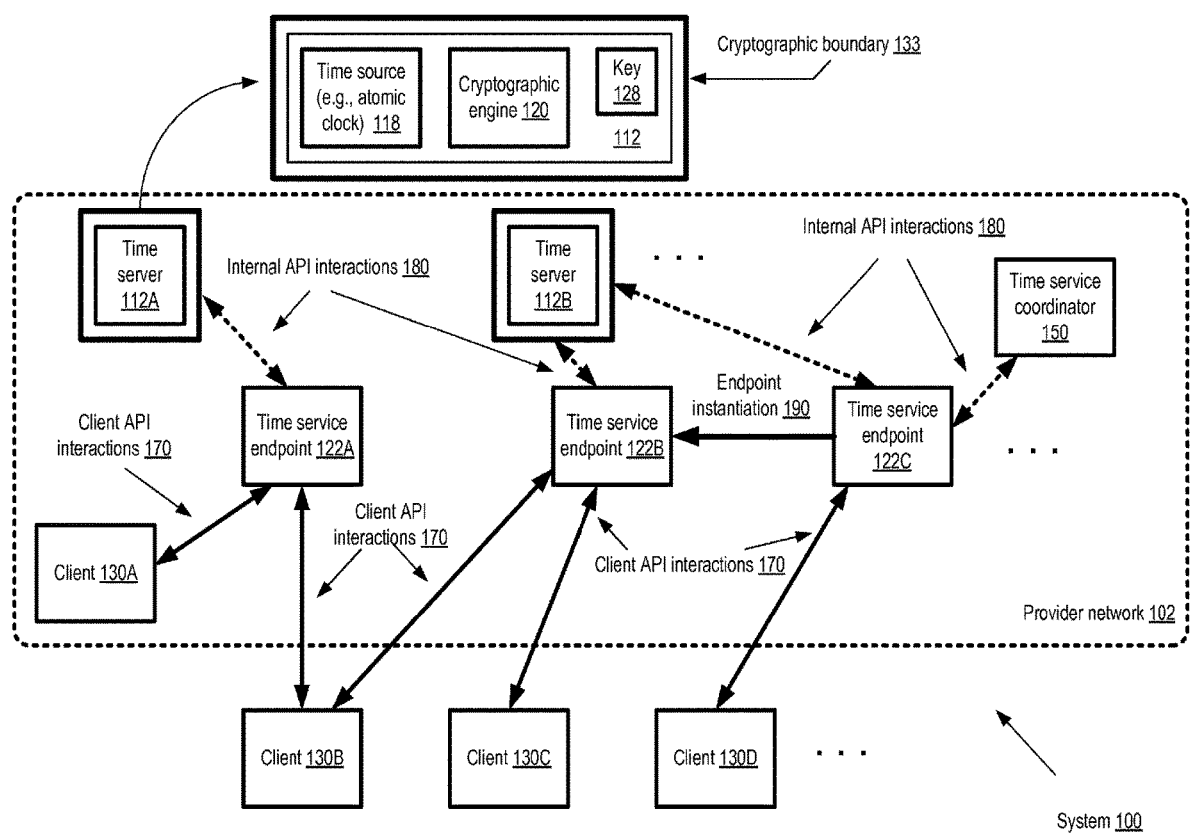
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing a network-accessible secure time service are described. Networks set up by an entity such as a company or a public sector organization to provide one or more services (such as various types of cloud-based computing or storage services) accessible via the Internet and/or other networks to a distributed set of clients may be termed provider networks in this document. A given provider network may include numerous data centers (which may be distributed across different geographical regions) hosting various resource pools, such as collections of physical and/or virtualized computer servers, storage devices, networking equipment and the like, needed to implement, configure and distribute the infrastructure and services offered by the provider. A number of different hardware and/or software components, some of which may be instantiated or executed at different data centers or in different geographical regions, may collectively be used to implement the underlying infrastructure supporting the secure time service in various embodiments. Several different types of time service clients from various network locations may utilize the time service, including, for example, other services provided by the provider network, third-party services implemented using resources of the provider network, or clients operating from locations outside the provider network.

According to one embodiment, a system may include one or more computing devices of a provider network. The computing devices may instantiate, as resources of a network-accessible multi-tenant time service, one or more time servers and one or more time service endpoints. Each time server may comprise a respective cryptographic engine, a high-precision/high-accuracy time source such as an atomic clock, and a cryptographic key inaccessible outside a cryptographic boundary within which the cryptographic engine and the time source are located. The term "cryptographic boundary" as used herein, may comprise an explicitly defined contiguous parameter that establishes the physical bounds of a cryptographic component or module. For example, the cryptographic boundary for a time server may comprise the walls of a physically secured room or section of a data center of the provider network, to which physical access is tightly restricted according to a security protocol. In on implementation, a room containing the time source, cryptographic engine and key corresponding to a time server may be protected by a physical lock that may require (a) multiple physical keys, each of which is owned by a different respective authorized time service administrator and/or (b) an entry to be added to a time service log in the presence of one or more authorized time service administrators. In some embodiments, definitions and/or descriptions of the cryptographic boundary may include details of the hardware/software and/or the security protocols used. In at least one embodiment, documents describing the security protocol(s) used to limit access across the cryptographic boundary may be provided to clients of the service, e.g., in response to a programmatic request from the client or during service level agreement negotiations for the time service. The cryptographic engine may comprise any desired combination of hardware/software devices that are configurable to encrypt/decrypt data according to one or more algorithms, such as various types of key-pair based cryptography algorithms. In at least some embodiments in which key pairs are used by the time service, one key of K1 the pair (K1, K2) being used for a given time server (e.g., a public key) may be provided to one or more clients of the service, while the other key K2 of the pair (e.g., a private key) may be retained within the cryptographic boundary of the time server (and inaccessible outside the cryptographic boundary). Thus, if a given client is able to use K1 to decrypt an encryption generated at a particular time server TS1 associated with key K2 in such an embodiment, this may serve to verify to the client that the encryption was indeed performed at TS1. The time source, which may for example comprise a rubidium atomic clock or a cesium atomic clock, may be synchronized with a "master" clock such as may be provided by a government agency in some embodiments (in the United States, for example, the U.S. Naval Observatory provides such a master clock). A given atomic clock may use resonance frequencies of the corresponding types of atoms for determining the passage of time; such an approach typically provides extremely consistent time measurements. In at least some embodiments, high precision time sources other than cesium/rubidium-based atomic clocks may be used, such as quantum clocks using aluminum or beryllium ions, pulsar-based clocks, or other types of time sources. The particular high-precision time sources used in various embodiments may be selected, for example, based on tradeoffs between various factors such as high accuracy (for example, some cesium atomic clocks are expected to provide time measurement accuracies of one second in approximately one million years), physical constraints (e.g., size of the devices/containers required), cost, etc.

The term "time service endpoint", as used herein, refers to a device or module that has an associated network address reachable from one or more clients of the time service. The term "endpoint" may be used synonymously herein with the term "time service endpoint". As described below in further detail, in at least some embodiments endpoints may be configured with private or hidden network addresses reachable only from within portions of the provider network. Some types of endpoints may instead be configured with network addresses accessible from the public Internet in various embodiments. At least one endpoint of the service may be configured to respond to requests formatted according to one or more application programming interfaces (APIs) in some embodiments. Several types of APIs may be supported in at least some embodiments, including, for example, APIs for timestamp requests and/or requests for instantiating or configuring/reconfiguring additional endpoints as described below. In various embodiments, other programmatic interfaces (e.g., web pages, standalone graphical user interfaces (GUIs) or command-line tools) may be implemented as well as, or instead of, APIs.

According to one embodiment, a particular endpoint may receive a request for a secure timestamp from a client. The request may specify one or more parameters such as a type or precision of timestamp, the format in which the timestamp is to be provided to the client, and/or a data object (e.g., a nonce generated by the client, a time-sensitive transaction record or document, or a local timestamp generated by the client) to be encrypted together with the timestamp. Upon receiving the client's timestamp request, the particular endpoint may determine or identify a particular time server to generate the timestamp (e.g., by selecting one time server from among several that may be available in some implementations). The endpoint may transmit, e.g., using a secure network protocol and secure network links controlled/implemented by the provider network, an internal representation of the client's request (e.g., indicating the type of timestamp desired and/or one or more other operations that the time server should perform on the data object included in the timestamp request) to the selected time server.

The selected time server may receive the internal representation of the timestamp request from the endpoint. A timestamp may be obtained from the time source of the time server, and at least in some embodiments an encryption of the combination of the newly-obtained timestamp and the data object may be generated using the cryptographic engine and the cryptographic key of the time server. This encryption of the timestamp and the data object may be provided in an internal response to the endpoint from which the internal request was received at the selected time server in some embodiments. The endpoint may then prepare and format a response comprising the encryption (e.g., based on the client's preferences for response format and contents), and transmit the formatted response to the client. The client may decrypt the encrypted value sent by the endpoint (e.g., using the other key of a key-pair corresponding to the time server's cryptographic key as mentioned earlier) to obtain the timestamp and the data object. The fact that the client is able to obtain intelligible content from the timestamp response using its key, together with the knowledge (obtained e.g., at the time that the client signed up for the time service) that the time server resides within a cryptographic boundary and that secure internal network links were used for communication with the time server, may serve as verification that the timestamp was indeed generated by a tamper-proof mechanism. In some embodiments a client may not necessarily provide a data object for encryption together with the timestamp, in which case the timestamp alone may be encrypted. In one embodiment, a client may request an unencrypted timestamp, in which case a new timestamp generated using the time source may be provided to the client without encryption.

The time server's interactions with endpoints may be logged in at least some embodiments, e.g., in the form of secure audit records. In one such embodiment, each request received at the time server, and/or each response generated, may itself be timestamped (e.g., using the time source or some other clock available at the time server) and logged in a storage device within the time server's cryptographic boundary. The audit records may eventually be transmitted to other secure locations within the provider network in some embodiments (e.g., using a secure storage service implemented at the provider network), and may be examined for debugging or other purposes as needed by authorized personnel. In some implementations the audit records may not be stored within the cryptographic boundary. In other implementations the audit records may only be stored within the cryptographic boundary and may be deleted at the time server itself when they are no longer needed (e.g., after some specified retention period).

In at least some embodiments, a given endpoint E1 may be configurable to receive client requests for instantiating an additional endpoint E2. For example, initially (e.g., upon signing up for the time service) a given client may be provided access to one endpoint by the time service, but if/when the client's time-related workload increases, the client may be able to request more endpoints. An instantiation request for another endpoint E2 may specify several types of parameters, such as, for example, a request category indicating the types of requests that E2 is to be configured to receive, network address preferences for E2, and so on, as described below in further detail in conjunction with the discussion of FIG. 4a. The request category parameter may be used in some embodiments to limit the types of functions that the additional endpoint is allowed to perform—e.g., while E1 may be allowed to receive requests for timestamps as well as requests for creating additional endpoints, E2 may be only be allowed to respond to timestamp requests.

When an endpoint E1 receives an instantiation request for an additional endpoint E2, in one embodiment the request may be translated into one or more internal requests to identify the resources needed for the additional endpoint, and to perform the necessary configuration steps to bring the additional endpoint online. In some embodiments a time service coordinator may be responsible for managing some or all of the configuration operations of the time service, and the endpoint E1 that received the client's instantiation request may initiate the process of instantiating the new endpoint by transmitting an internal version of the client's instantiation request to such a coordinator. The coordinator may identify the resources needed, initiate the configuration of the endpoint, and launch or instantiate the new endpoint E2. In some embodiments, E1 may be notified (e.g., by the coordinator) when E2 goes online (i.e., when E2 starts up and becomes accessible via network interactions). The coordinator may itself be implemented in a distributed fashion in at least some embodiments, and may comprise a plurality of software and/or hardware components. Upon determining that E2 has been instantiated, E1 may provide a notification to the requesting client in at least some embodiments.

The distribution of the time service functionality in some embodiments between client-facing endpoints on the one hand, and back-end time servers on the other hand, may help to further decrease the likelihood that security of the time servers themselves can be breached. For example, the network addresses of the time servers (and/or the coordinators) may never be revealed to clients of the time service in some embodiments. In some implementations, an additional level of indirection or obfuscation may be introduced, in which the traffic between the endpoints and the time servers may itself be managed via some set of intermediary devices, so that an endpoint may not have the actual address of the time server with which it communicates, but may for example rely on an alias or a proxy. In some embodiments, different levels of security may be supported for different clients— e.g., some clients may be willing to pay more to use proxies between the endpoints and the time servers, while others may indicate that proxies are not required.

In one embodiment, an instantiation request from a client to a given endpoint E1 may comprise metadata provided by the client for inclusion in a response to be provided by a newly-instantiated endpoint E2. For example, in one embodiment a third party such as "Company X" may use the provider network's time service to implement a document timestamping service, according to which Company X's client C1 may be provided a timestamp certifying when a particular electronic document was transmitted. Thus, Company X may be a client of the provider network's time service, while C1 may be a client of Company X (in some scenarios, C1 may not even be aware of the use by Company X of the time service). In such a scenario, in one embodiment, Company C1 may include, within metadata included in an instantiation request for E2, branding or messaging information such as a message string "This document's timestamp is certified by Company X". After E2 is instantiated, clients of Company X such as C1 may be directed to send their documents for timestamping to E2, and E2 may include, in its responses to the clients, the metadata message "This document's timestamp is certified by Company X" together with a timestamp value obtained from the provider network's time service. Thus, in such embodiments, at least some aspects of a given endpoint's behavior may be customizable by a client.

According to some embodiments, the provider network may allow its clients to set up isolated or private networks using some subset of the resources within the provider network, and allow the clients substantial freedom in deciding the network addresses of various devices within such private networks, thus emulating so-called "private clouds". In one implementation, for example, within such a private network or "virtual private cloud" supported by the provider network, the client that owns the virtual private cloud may be able to use IP (Internet Protocol) address ranges that actually overlap with some set of IP addresses already in use elsewhere, and the provider network may provide the appropriate address translations for traffic leaving or entering the virtual private cloud. In at least some embodiments, when requesting a new endpoint E2, a client may indicate that E2 is to be instantiated within a private network (i.e., with an IP address corresponding to the private network's IP address range). In such embodiments, the time service (e.g., the coordinator) may be responsible for ensuring that the traffic between E2 and the time servers used by E2 (which may or may not be within the client's private network) is routed correctly. In some embodiments, a client may request that a time server be included within the client's private network, and the time service may configure the network settings of a selected time server accordingly.

In at least some embodiments, a client may wish to set up an endpoint E2 as a Network Time Service (NTP) server that can be used to coordinate time across some set of the client's virtual or physical computer systems. In such embodiments, the instantiation request from the client may specify that an NTP server is to be set up, and the coordinator of the time service (and/or the endpoint E1 that receives the instantiation request) may configure the NTP server accordingly. In some embodiments, a client may indicate whether a new endpoint E2 is to be configured with a "private" IP address (e.g., an address not visible or accessible outside the provider network) or a "public" IP address (e.g., an address visible/accessible from the public Internet) and the new endpoint E2 may be configured accordingly by the time service.

In embodiments in which the provider network is distributed across multiple data centers or geographical regions, several different time servers, or pools of time servers, and corresponding endpoints may be instantiated. The number and/or placement of the time servers and/or the endpoints may be determined based on various factors such as availability requirements for the time service, workload levels at the endpoints and/or the time servers, latency requirements for timestamps from geographically-distributed clients, and so on.

In at least some embodiments, a plurality of pricing policies may be supported for the time service. Clients may be provided programmatic interfaces enabling them to choose from among different pricing policies, such as a respective flat fee per timestamp request or endpoint instantiation, tiered pricing, or dynamically varying pricing based on supply and demand for timestamps. Billing amounts for the timestamp service may be determined based on the client's selected pricing policies and/or the extent to which they use the time service in such embodiments.

Example System Environment

FIG. 1 illustrates an example system environment, according to at least some embodiments. As shown, system 100 may include a provider network 102 set up to support a plurality of services for internal and external clients, including a secure time service. In the depicted embodiment, three types of components of the secure time service are shown: time service endpoints 122 (e.g., endpoints 122A, 122B and 122C), time servers 112 (e.g., 112A and 112B), and a time service coordinator 150. Collectively, these components may be configured to provide time service functionality to a plurality of clients 130, including clients 130A, 130B, 130C and 130D in the depicted embodiment. Some clients, such as client 130A, may access the time service from within the provider network 102, while other clients such as 130B-130D may access the time service from outside the provider network.

In the depicted embodiment, the coordinator 150 may be responsible for such functions as determining the number and at least some aspects of the configuration of time servers 112 and/or endpoints 130, and/or launching or instantiating new endpoints in response to clients' instantiation requests received at endpoints. Each time server 112 may comprise, within a respective cryptographic boundary 133, a high-precision time source 118 (e.g., a rubidium clock or a cesium clock), a cryptographic engine 120 and a cryptographic key 128. Each time service endpoint 122 may be associated with a network address accessible to some set of clients 130, and may be configured to receive client requests submitted via client API interactions 170. In some embodiments, other interfaces (such as web pages or GUIs) may be built using underlying client APIs, and the interactions 170 may employ such higher-level interfaces.

Within the provider network, requests received by the endpoints 122 may be translated into internal representations and transmitted, e.g., via internal API interactions 180, to time servers 112 and/or coordinators 150 in the depicted embodiments. Responses received by the endpoints from the time servers 112 or the coordinator 150 may also use internal APIs, and corresponding client API responses may be generated by the endpoints for transmission to the requesting clients 130. The times servers and the coordinator may be isolated from the direct interactions with the clients 130 in at least some embodiments e.g., the network addresses for time servers and coordinators may not be provided to clients 130. In at least some embodiments, the time servers 112 and/or the coordinator 150 may be configured to ignore any requests that do not use the time service's internal API, and the internal API may not be exposed to clients 130. Accordingly, even if a client 130 were somehow to be able to transmit a message to a time server or to a coordinator in such an embodiment, the message would be ignored. Internal API interactions may use secure networking protocols and secure networking paths, all of whose links and network devices remain under full control of the provider network operator (as opposed to links of the public Internet or of client networks, whose security may be beyond the control of the provider network operator) in the depicted embodiment Clients 130 may submit time service requests of various kinds in accordance with the client API to a given endpoint 122 in the depicted embodiment. Some clients may submit requests to multiple endpoints as needed (such as client 130B, which is shown interacting with endpoint 122A and 122B), while other clients may be provided access to a single endpoint 122 in some embodiments.

In response to a timestamp request received by a particular endpoint 122 from a client 130, the endpoint may transmit, e.g., using an internal API, an internal representation of at least a portion of the request contents to a particular time server 112. For example, the internal representation may include an indication of desired properties (such as precision) of the timestamp, as well as one or more data objects, such as a nonce, included in the timestamp request by the client. The endpoint 122 may receive an internal response (e.g., using the internal API) from the time server 112, which comprises at least an encryption of a combination of (a) a timestamp generated using the time source and (b) a data object included in the client's timestamp request. The endpoint 122 may then transmit a response comprising the encryption back to the client 130. The client 130 may decrypt the encrypted value, e.g., using a client key corresponding to the time server's key, extracting the timestamp and the data object. The timestamp may then be used by the client for any desired purpose. In some embodiments, clients may not necessarily provide data objects to be encrypted in combination with timestamps, in which case the timestamp alone may be encrypted. In one embodiment, unencrypted timestamps generated using a high-precision time source may be provided at client request.

In some embodiments, a given endpoint 122 may also be configured to receive instantiation requests for additional endpoints. For example, in the embodiment shown in FIG. 1, an instantiation request may be received by endpoint 122C may have led to the instantiation 190 of endpoint 122B. A given endpoint instantiation request generated by a client may include an indication of the types or categories of client requests to be handled by the additional endpoint. For example, consider a scenario in which the requests supported by a client-facing API in one embodiment are broadly classified into two categories: category Cat1 comprising timestamp requests, and category Cat2 comprising instantiation requests. In such an embodiment, one instantiation request may indicate that the additional endpoint to be established should support only Cat1 requests, while another instantiation request may indicate that a new endpoint should support both Cat1 and Cat2 requests, or only Cat2 requests.

When an instantiation request is received by an endpoint such as 122C configured to respond to such requests, the endpoint 122C may initiate the requested instantiation, e.g., by submitting a corresponding internal API request to time service coordinator 150 in the depicted embodiment. The coordinator may be responsible in some embodiments for identifying resources to be used to host the new endpoint (e.g., 122B), performing the necessary configuration operations, launching or instantiating the new endpoint 122B and notifying the endpoint from which the internal instantiation request was received. In some implementations, the endpoint 122C that received the instantiation request may itself perform some of the configuration required (as indicated by arrow 190 in FIG. 1), or may confirm that the new endpoint is up and running, before transmitting a notification back to the requesting client indicating that the requested additional endpoint has been launched. Additional details regarding the contents of various requests and responses, and the interactions between various entities illustrated in FIG. 1, are provided below.

Client Interactions and Corresponding Internal Workflows

Figure 2:
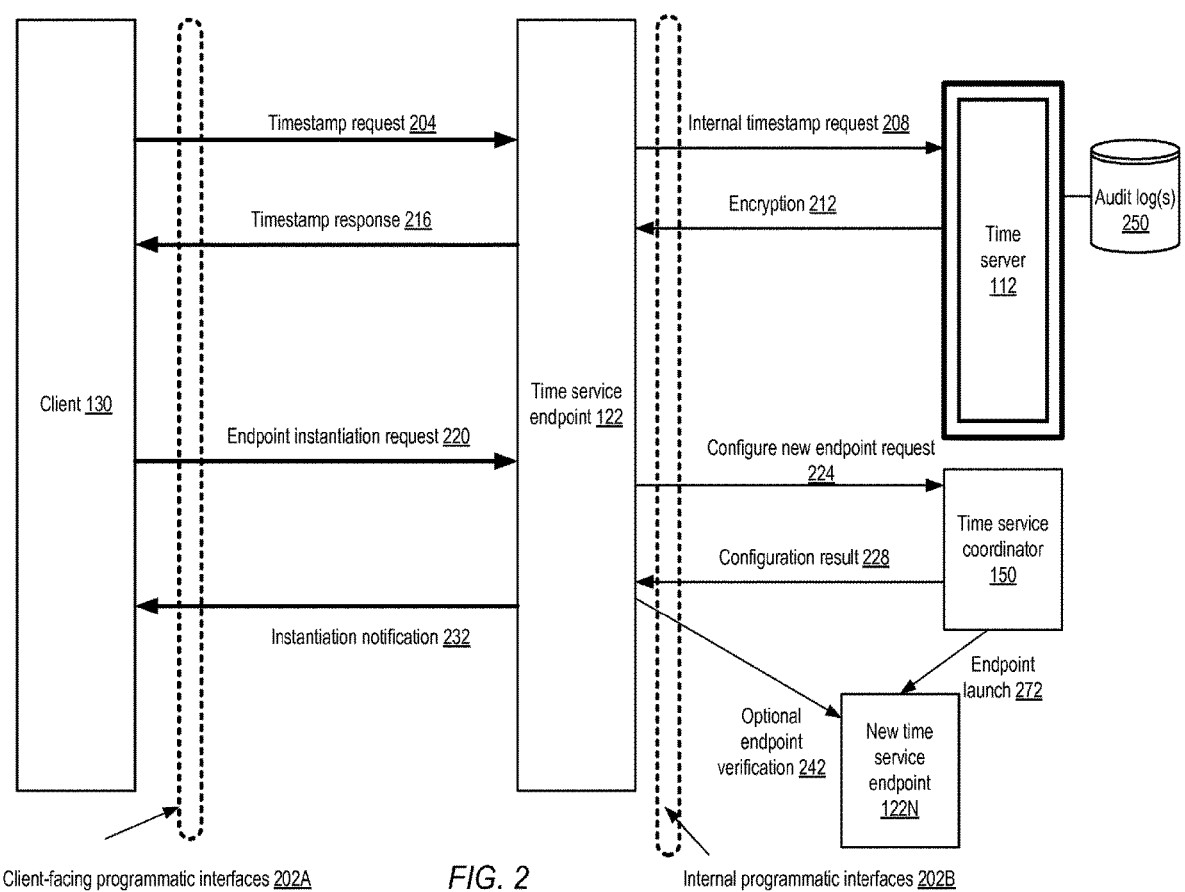
FIG. 2 illustrates example interactions between a client of a time service and a time service endpoint, and corresponding internal interactions within the time service, according to at least some embodiments.

FIG. 2 illustrates example interactions between a client 130 of a time service and a time service endpoint 122, and corresponding internal interactions within the time service, according to at least some embodiments. As shown, the time service may implement at least two sets of programmatic interfaces in the depicted embodiments: client-facing interfaces 202A, and internal programmatic interface 202B. A client 130 may submit requests to endpoints 122, and receive responses to those requests from endpoints 122, using interfaces 202A. Internally, the endpoints 122 may communicate with time servers 112 and coordinators 150 via interfaces 202C in the depicted embodiment. Interfaces 202C may not be accessible to clients 130 in at least some embodiments, e.g., to decrease the probability of successful attacks on the time service.

A client 130 may submit several types of requests to the endpoint 122, such as timestamp requests 204 or endpoint instantiation requests 220. When it receives a timestamp request 204, endpoint 130 may transmit an internal version 208 of the timestamp request to a time server 112. The timestamp request 204 may include a data object (such as a nonce generated by the client, or a document generated by the client) in at least some embodiments, intended to be encrypted by the time server together with a timestamp, and the data object may be passed on to the time server in internal request 208. The time server may generate a timestamp using its high-precision time source, combine the data object (e.g., using concatenation) with the timestamp, encrypt the combination of the timestamp and the data object, and provide the encryption 212 to the endpoint 122 via an internal interface 202B. In at least some embodiments, audit records representing the request received by the time server 112 and/or the response generated by the time server 112 may be stored in audit log(s) 250. In some embodiments, the time server 112 may first store an audit record or records in an internal storage device within the cryptographic boundary, and later export the audit logs to a secure data store within the provider network.

In the depicted embodiment, when endpoint 122 receives an endpoint instantiation request 220 from a client 130 via an interface 202A, a corresponding internal request 224 to configure a new endpoint may be transmitted to the time service coordinator 150 using an internal interface 202B. The coordinator 150 may identify the necessary resources (e.g., compute, storage and/or networking resources of the provider network), perform the needed configuration operations on the resources, and launch or
instantiate the new endpoint 122N, as indicated by the arrow labeled 272. The coordinator 150 may provide a configuration result 228 via the internal interface 202B to the endpoint 122 from which the request was received. The endpoint 122 may in turn transmit a notification 232 regarding the instantiation to the requesting client 130 via an interface 202A. In some embodiments, the endpoint 122 may perform an optional endpoint verification 242, e.g., by submitting a request of the request category that the new endpoint is expected to support and validating the response, before notifying the client that the requested endpoint has been instantiated. In some embodiments, clients 130 may also be able to change the configurations of endpoints that have been instantiated on their behalf (e.g., by requesting a change to the network addresses or the types of operations that the endpoint is to support). In such embodiments, a configuration request may be sent instead of the instantiation request 220, and the internal workflow within the time service components may be similar to that shown in FIG. 2 for instance instantiation (i.e., the endpoint 122 may transmit the configuration request to the coordinator 150, which may perform the requested configuration change and provide a response to the endpoint, which may in turn confirm the configuration change to the client 130).

Example Contents of Client Requests and Responses

Figure 3A:
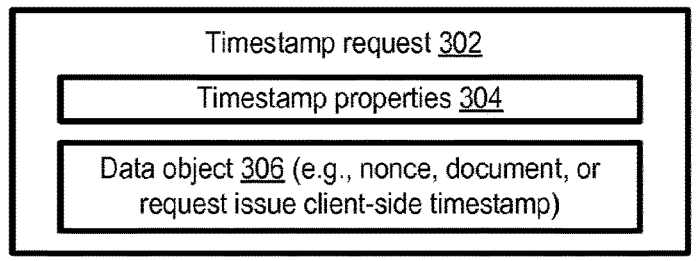
FIGS. 3a and 3b respectively illustrate example contents of timestamp requests and corresponding timestamp responses provided by a time service, according to at least some embodiments.
Figure 3B:
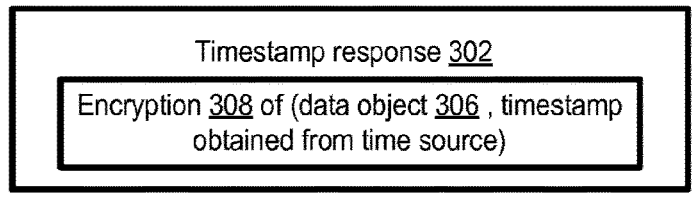

FIGS. 3a and 3b respectively illustrate example contents of client timestamp requests and timestamp responses provided by a time service, according to at least some embodiments. As shown, a timestamp request 302 may specify one or more timestamp properties 304, such as a desired format, a precision, or accuracy metric of the timestamp. In some embodiments the timestamp request may also indicate a latency requirement indicating how quickly the timestamp is to be provided to the client. The timestamp request may also include one or more data objects 306 to be encrypted together with the timestamp in at least some embodiments (although such objects may be optional in some embodiments). Examples of such data objects may include a cryptographic nonce (an arbitrary number or string intended to be used at most once, e.g., for a cryptographic communication), a document such as a tax return or stock transaction record that the client wishes to have encrypted with a corresponding timestamp, or a client-side timestamp that may be used by the client later to determine the response time for the timestamp request. As shown in FIG. 3b, the timestamp response 302 corresponding to a timestamp request 302 in the depicted embodiment may include at least the encryption of the combination of the timestamp and the one or more data objects 306. If no data object were specified, the timestamp response 302 may include only the encrypted timestamp.

Figure 4A:
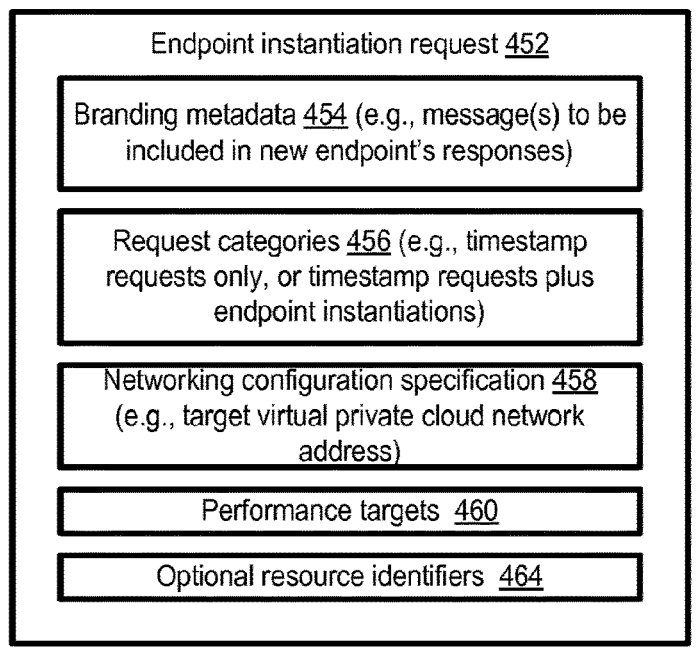
FIGS. 4a and 4b respectively illustrate example contents of endpoint instantiation requests and instantiation notifications provided by a secure time service, according to at least some embodiments.
Figure 4B:
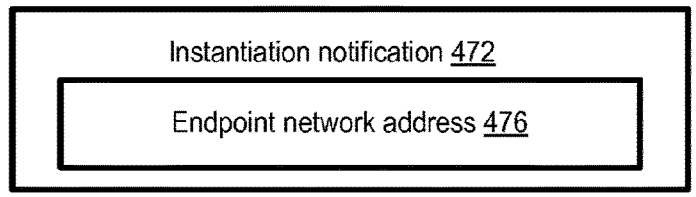

FIGS. 4a and 4b respectively illustrate example contents of endpoint instantiation requests and instantiation notifications provided by a time service, according to at least some embodiments. As shown in FIG. 4a, an endpoint instantiation request 452 may include, for example, branding metadata 454, at least a portion of which may be intended for inclusion in responses to be provided by the newly-instantiated endpoint. For example, a message such as "This timestamp is certified by Company X" may be included in the metadata 454. In some embodiments, metadata 454 may include advertisements or slogans. Element 456 of an instantiation request 452 may be used to indicate the categories of requests that the new endpoint is to be configured to expect and respond to—for example, some new endpoints may be restricted to providing encrypted timestamps, others may be configured to provide timestamps and instantiate further additional endpoints, while others may be limited to instantiating additional endpoints only and may not be configured for timestamp request handling.

In some embodiments, clients may specify various aspects of the configuration of a new endpoint in an instantiation request 452. Element 458 may be used to specify networking configuration of the new endpoint, e.g., whether the endpoint is to be configured with an address within the client's private/isolated network (or virtual private cloud), whether the IP address of the new endpoint should be public (e.g., accessible from the public Internet) or private (e.g., not advertised outside the provider network), and so on. In some embodiments, clients may specify performance targets 460 for the new endpoint, e.g., maximum or percentile limits for acceptable latency for timestamp requests.

In one embodiment, in which for example the provider network implements a virtualized computing service, and virtualized compute servers of such a service may be configured as time service endpoints, a given client 130 may acquire some number of virtualized compute servers. If the client 130 wishes to deploy one of its own virtualized servers to be used for a new endpoint, a resource identifier 464 of the client's available virtualized server may be provided in the instantiation request 452, together with an indication that the client would like to utilize the identified resource for (or as) an endpoint. In some embodiments, an instantiation request may include other elements (not shown in FIG. 4*a*) as well, such as for example a restricted list of IP addresses from which requests are to be handled by the new endpoint. In response to the instantiation request, if a new endpoint is successfully launched, an instantiation notification 472 comprising at least the network address 476 of the new endpoint may be provided to the client. If the new endpoint was not launched (e.g., due to lack of sufficient resources or due to configuration problems), an error indication may be provided to the client instead in some implementations.

Distributed Time Service Components

Figure 5:
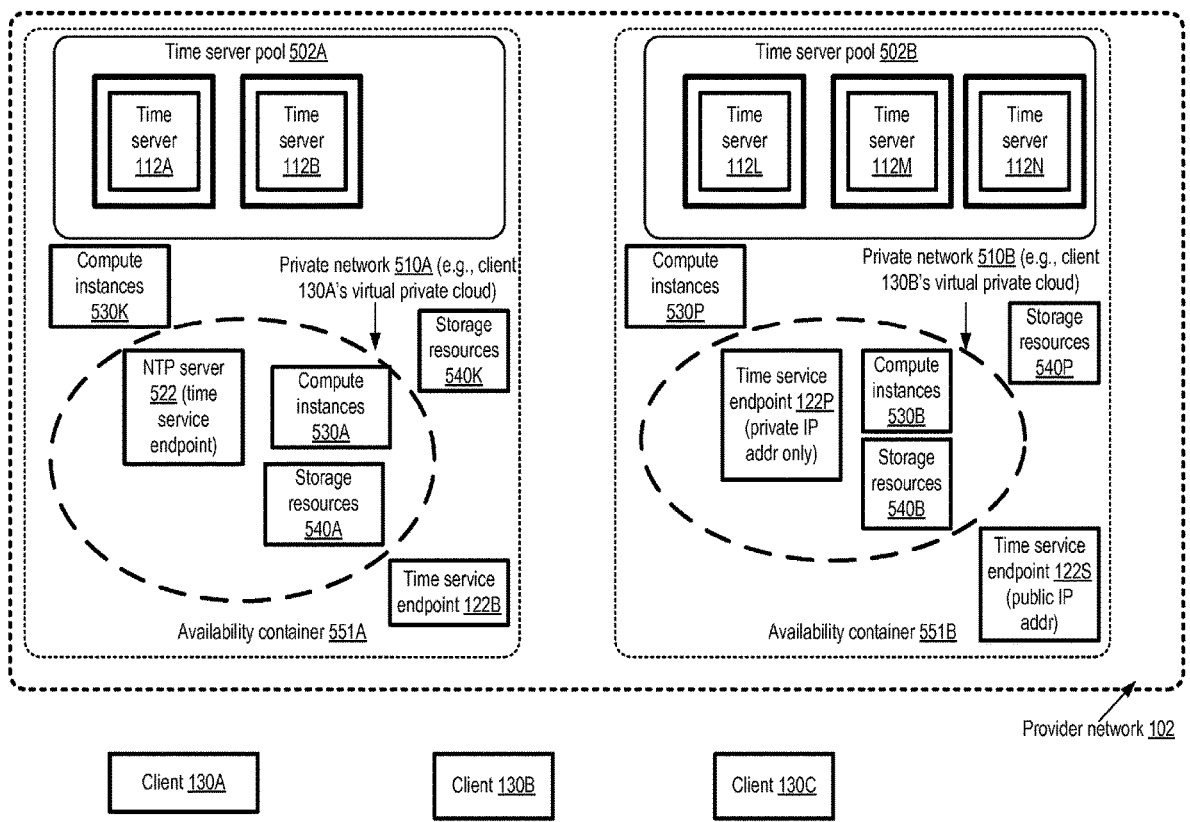
FIG. 5 illustrates a provider network environment in which time servers are distributed across a plurality of availability containers, according to at least some embodiments.

As noted earlier, in at least some embodiments, the provider network 102 at which the secure time service is implemented may be distributed across numerous data centers and/or geographical regions. Such geographical distribution may not only help the various provider network services to achieve better response times (e.g., by serving clients in a given geographical region from a nearby data center rather than a more distant data center), but may also help achieve higher availability and disaster recovery targets. In at least some embodiments, the resources of the provider network may be organized into a plurality of availability containers, where in general, infrastructure failures (such as power outages and the like) are not expected to spread across the boundary of a given availability container. Thus, each availability container in such embodiments may be engineered to have a different availability profile from the other availability containers, e.g., with its own independent set of infrastructure facilities. A given availability container may comprise portions (or all) of one or more data centers in some embodiments. FIG. 5 illustrates a provider network environment in which time servers are distributed across a plurality of availability containers, according to at least some embodiments.

Two example availability containers 551A and 551B are shown in FIG. 5, each with a respective pool of time servers 502 (e.g., pool 502A with time servers 112A and 122B for availability container 551A, and pool 502B with time servers 112L, 112M and 112N for availability container 551B). The mapping of time servers to physical locations, e.g., the number of time servers to be set up in a given availability container 551A (or a given data center or region) may be determined initially based on a model (e.g., an analytic or simulation model) of expected time service request rates, resource consumption per time server per request of each type, and/or other factors in some implementations. The number of time servers may be adjusted over time in such implementations, as metrics are collected on the actual received workload, resources consumed, and/or failure/overload incidents. In some embodiments, one or more failover relationships may be established between given pairs of time servers—e.g., time server 112A and time server 112B may be configured as a local failover pair within the availability container 551A, while time server 112A and time server 112L may also be linked in a failover relationship crossing availability zone boundary. If, in such an embodiment, time server 112A fails or becomes unresponsive or unreachable to requests from client 130B or 130C, time server 112B may first be selected as an alternate source for secure timestamps. If both time servers 112A and 112B of availability container 551A become unavailable, time server 112L from availability container 551B may be used instead. It is noted that in order for such failover relationships to be implemented, in at least some embodiments more than one time server may have to use the same cryptographic key (e.g., time servers 112A and 112B may use the same cryptographic key in the depicted embodiment).

As mentioned earlier, in some embodiments, isolated or private networks within the provider network may be set up for clients, within which the clients may be able to configure networking parameters (such as IP addresses) of their choice, just as if the private networks were set up in the clients' own premises. Such private networks may be termed "virtual private clouds" in some environments. Two examples of such private networks, 510A (established for client 130A) and 510B (established for client 130B) are shown in FIG. 5. As shown, only a subset of a given availability container's resources may be included within a given private network set up for a client 130. For example, in availability container 551A, private network 510A includes compute instances (e.g., virtualized compute servers) 530A, storage resources 540A and a time service endpoint 522 configured as an NTP server. The NTP server may be used to set or coordinate the local clocks on various devices of the private network 510A, for example, with the help of timestamps obtained from a time server 112. The NTP server may periodically check its own clock using time server 112A in the depicted embodiment, and may make any adjustments necessary to its own clock or to clocks of other devices within the private network based on the results of the check. Availability container 551A also contains other compute instances 530K, storage resources 540K, and time service endpoints such as 122B, that need not belong to any client's private network. Similarly, in availability container 551B, compute instances 530B, storage resources 540B and endpoint 122P are included in client 130B's private network 510B, while compute instances 530P, storage resources 540P and endpoint 122S do not belong to any client's private networks. Some clients (such as 130C) may not have any private networks in the depicted embodiment. In the depicted embodiment, some endpoints (such as 122S) may be configured with public IP addresses (e.g., addresses that are visible at, and accessible from, portions of the public Internet), while other endpoints (such as 122P) may be configured with private IP addresses that are only known within the provider network 102.

Methods for Implementing Time Service

Figure 6:
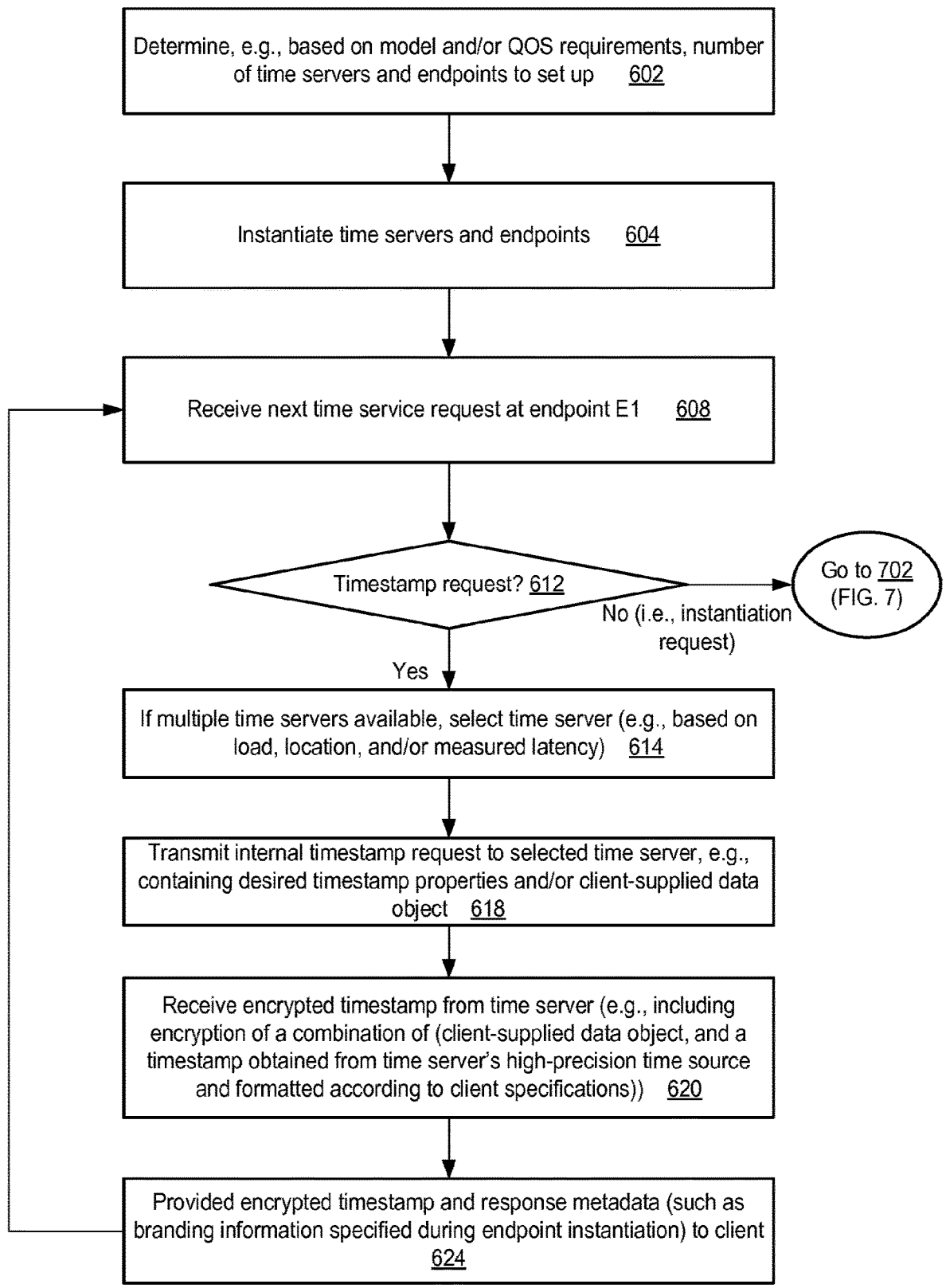
FIG. 6 is a flow diagram illustrating aspects of operations that may be performed at a time service in response to a timestamp request, according to at least some embodiments.

FIG. 6 is a flow diagram illustrating aspects of operations that may be performed at a time service in response to a timestamp request, according to at least some embodiments. As shown in element 602, the number and location(s) of time servers 112 and endpoints 122 to be set up may be determined or estimated, e.g., based on using a simulation model or an analytic model, and on various quality-of-service (QOS) requirements such as availability requirements, latency or throughput requirements for various types of time service requests, and the like. The time servers 112 and the endpoints 122 may then be instantiated (element 604). The mappings of time service components to physical locations and/or network addresses may change over time, e.g., in response to changing workloads or to client requests.

An endpoint E1 may receive a time service request (element 608). In the depicted embodiment, at least two types of time service requests may be supported: timestamp requests and instantiation/configuration requests for additional endpoints. If the received request is a timestamp request (as determined in element 612), the operations corresponding to elements 614-624 may be performed, as described below. If the received request is an instantiation or configuration request for a new endpoint (as also determined in element 612), operations corresponding to elements of FIG. 7 may be performed, starting from element 702.

Multiple time servers with the same cryptographic key may be set up in some embodiments, e.g., to handle increasing timestamp request workloads. Alternatively, in at least some embodiments, a given key of a given key pair may only be used by one time server, but multiple time servers may be set up on behalf of a given client (and the other key for each key-pair may be communicated to the client). In response to receiving a given timestamp request, if multiple time servers are available that can handle the request, the endpoint E1 may select a particular time server (element 614), e.g., based on various factors such as the current workload at the time servers, the locations of the time servers, cost/pricing considerations, and/or the latency measured for responses from the time servers. (In scenarios in which only one time server is available, operations corresponding to element 614 may not be required.) The endpoint E1 may then transmit an internal timestamp request 208 to the selected time server (element 618), e.g., using an internal API 202B that is different from the client-facing API 202A used by the client to submit the timestamp request. The internal request may include, for example, a representation of one or more desired timestamp properties indicated by the client, and/or a data object (such as a cryptographic nonce, a document or transaction record, or a client-side timestamp) that is to be encrypted together with the timestamp generated by the time server.

As shown in element 620, the endpoint E1 may receive an encrypted timestamp from the time server. In some embodiments the time server may have encrypted a combination of (a) a timestamp generated using the time server's time source and (b) the data object provided by the client in the timestamp request, using the time server's cryptographic key. The timestamp may have been generated with the desired properties (e.g., the desired precision, accuracy level, and/or format) indicated in the client's timestamp request and passed on to the time server in the internal timestamp request. If no data object were provided, the timestamp alone may be encrypted. Endpoint E1 may provide, in a response to the requesting client, at least the encrypted timestamp (element 624). In some embodiments, the endpoint E1 may also be configured to include, in its response to the client, a portion of metadata supplied as part of the instantiation process for E1 or during later configuration of E1—for example, E1 may be configured to include a branding message or an advertisement with the timestamp response.

Figure 7:
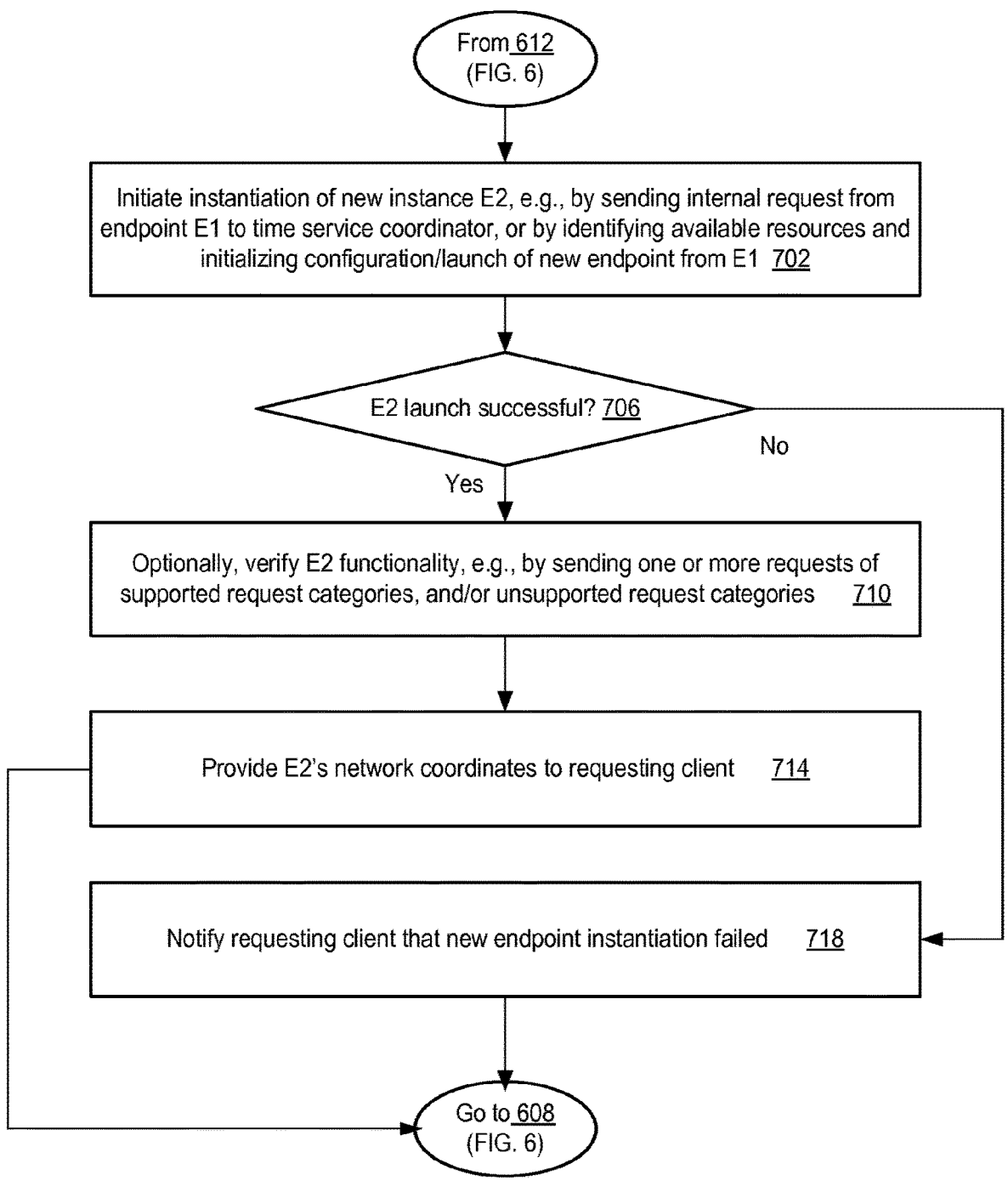
FIG. 7 is a flow diagram illustrating aspects of operations that may be performed at a time service in response to an endpoint instantiation request, according to at least some embodiments.

FIG. 7 is a flow diagram illustrating aspects of operations that may be performed at a time service in response to an endpoint instantiation request, according to at least some embodiments. The instantiation request may include indications of various desired properties of the new endpoint, such as the request categories 456 to be supported, branding metadata 454, networking configuration specifications 458, performance targets 460, and the like in some embodiments. As shown in element 702, in response to receiving an instantiation request for a new endpoint, endpoint E1 may initiate the process of instantiating a new endpoint E2. In some embodiments, endpoint E2 may transmit a corresponding internal request (such as the "configure new endpoint" request 224 shown in FIG. 2) using an internal API 202B to a time service coordinator 150. In such an embodiment, the coordinator 150 may be responsible for identifying various resources (e.g., compute resources, storage, or network resources) for a new endpoint E2, and configuring the resources with the appropriate software and parameter settings before booting/launching E2. Configuration of a new endpoint E2 that is intended to respond to timestamp requests may include, among other operations, identifying which particular time server(s) E2 is to use for the timestamp requests that it receives. In other embodiments, the endpoint E1 may itself be configured to identify the resources needed for the additional endpoint E2, and perform the necessary configuration operations and launch. In some embodiments, the requesting client 130 may optionally indicate resource identifiers 464 of resources already owned by or allocated to the client that may be used for the new endpoint, in which case the process of identifying appropriate resources may be simplified (although the time service coordinator 150 or E1 may still need to verify that the specified resources are adequate to implement the new endpoint E2 in at least some embodiments).

If the new endpoint E2 is launched successfully (as determined in element 706), in one embodiment E1 may be configured to optionally test E2—e.g., to send it a request of a request category (e.g., a timestamp request) that it is expected to support, and/or to send it a request of an unsupported request category and ensure that the appropriate type of response (e.g., an encrypted timestamp in response to a timestamp request, or an error message in response to an unsupported request) is obtained (element 710). The network coordinates (e.g., IP addresses) and/or port(s) to be used for time service requests) of the newly instantiated endpoint E2 may then be provided to the requesting client (element 714). If the endpoint instantiation failed, in some embodiments an error message may be sent to the client (element 718).

It is noted that at least in some embodiments, clients may submit requests to reconfigure existing endpoints (e.g., to change branding metadata, to change the performance targets of the endpoint, or to change the set of IP addresses from which requests are to be accepted). In response to such reconfiguration requests, operations similar to some of the operations illustrated in FIG. 7 may be performed in at least some embodiments. Depending on the nature of the configuration changes requested, some of the operations of FIG. 7 may not be required—e.g., no new resources may be needed, or a restart or re-launch of the reconfigured endpoint may not be required.

After completing the operations to respond to the received request (e.g., the operations of FIG. 6 for timestamp requests, and the operations of FIG. 7 for instantiation/reconfiguration requests), E1 may then await the next time service request addressed to it in the depicted embodiment. Operations corresponding to element 608 onwards of FIG. 6 may again be performed based on the type of time service request received.

Figure 8:
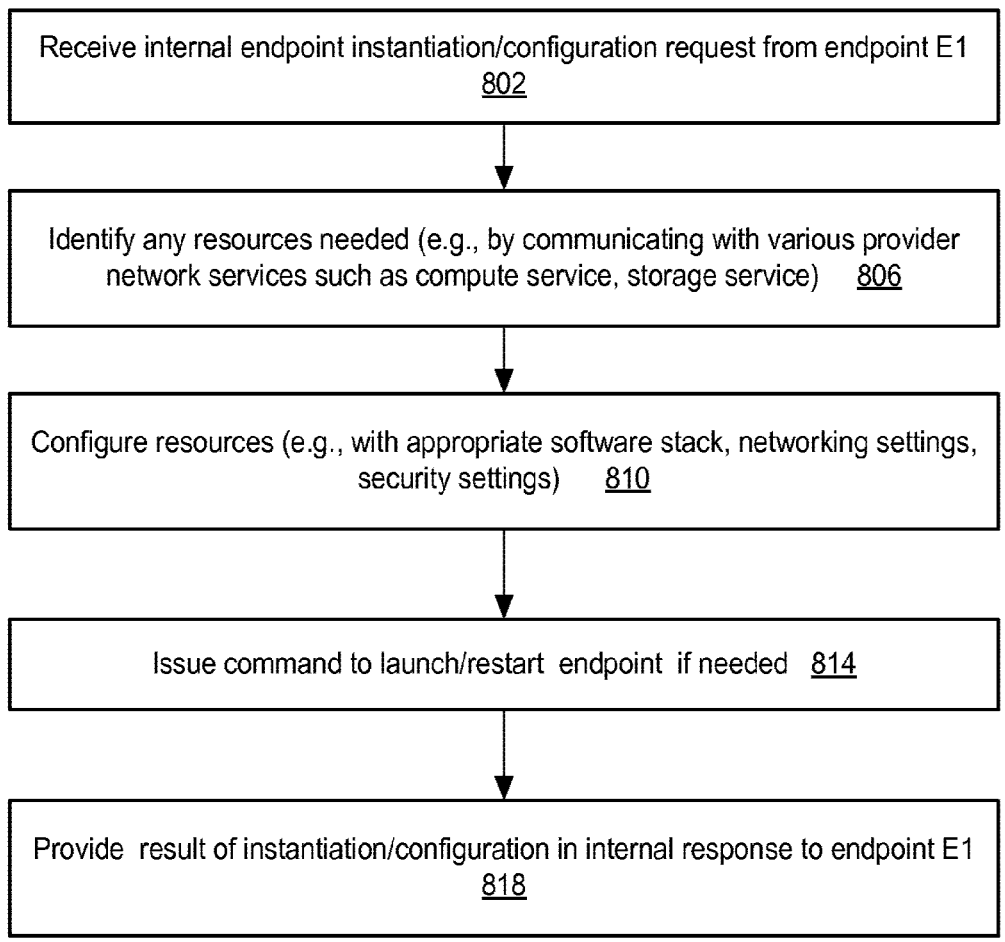
FIG. 8 is a flow diagram illustrating aspects of operations that may be performed at a time service coordinator in response to receiving an internal endpoint configuration request from a time service endpoint, according to at least some embodiments.

As described earlier, in some embodiments, a time service coordinator 150 may be responsible for at least some types of configuration operations on endpoints 122 and/or time servers 112. The coordinator's functions may be performed collectively by a plurality of computing devices and/or a plurality of software modules in at least some embodiments. FIG. 8 is a flow diagram illustrating aspects of operations that may be performed at a time service coordinator 150 in response to receiving an internal endpoint instantiation or configuration request from a time service endpoint, according to at least some embodiments. As shown in element 802, the coordinator 150 may receive an internal request from an endpoint E1, e.g., to either instantiate a new endpoint E2 or to reconfigure an existing endpoint (which may be the same endpoint E1 at which the request is received, or a different endpoint E2). Depending on the nature of the request, additional resources may be required—e.g., if a new endpoint is to be set up and the requested client has not specified resources to be used, or if a requested reconfiguration calls for a higher rate of timestamp requests to be supported, which may require more resources than currently allocated. As shown in element 806, the coordinator 150 may be configured to identify any additional resources needed, e.g., by communicating with various other services of the provider network such as a compute service and/or a storage service. In some scenarios the coordinator may have to instantiate one or more new time servers 112 in response to a client's request for instantiating additional endpoints (e.g., if the currently operational time servers are not able to handle any additional workload). In one embodiment, a client may submit a request for instantiating one or more additional time servers, and the coordinator 150 may identify the resources needed, in a manner similar to the way in which additional resources for new endpoints are identified.

The coordinator 150 may configure the appropriate resources (e.g., either additional resources, or the resources already in place, or a combination of new and existing resources) (element 810) in accordance with the request. For example, software may have to be installed/deployed/updated on the resources, networking and/or security settings may need to be modified, or other types of configuration changes may be performed. If a launch or restart is needed, the coordinator 150 may issue the appropriate commands (element 814). The results of the configuration/instantiation may be provided to the endpoint E1 (element 818), e.g., in an internal response via an internal API 202B. In some embodiments, upon receiving the results, E1 may transmit a corresponding notification via a client-facing programmatic interface 202A to a client 130.

Figure 9:
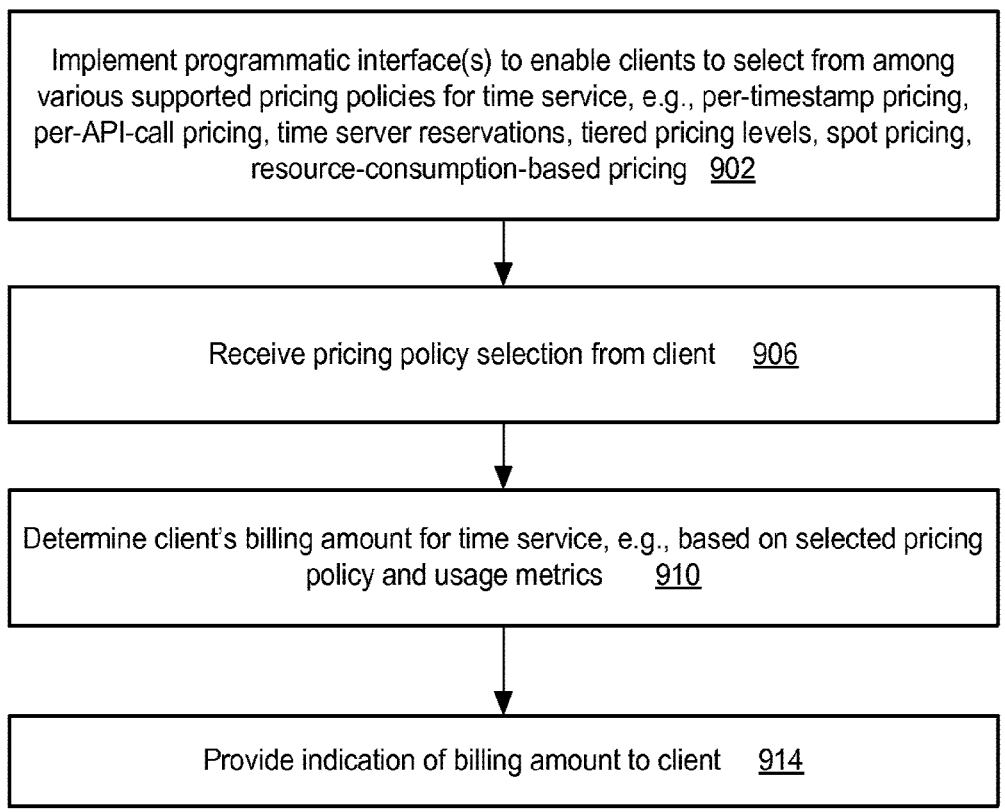
FIG. 9 is a flow diagram illustrating aspects of operations that may be performed to support a plurality of pricing policies for a time service, according to at least embodiments.

In some embodiments, clients may be able to choose a pricing policy to be applied to their time service requests, from among numerous pricing policy options implemented by the time service. FIG. 9 is a flow diagram illustrating aspects of operations that may be performed to support a plurality of pricing policies for a time service, according to at least embodiments. As shown in element 902, one or more programmatic interfaces (e.g., client-facing APIs, web pages, command-line tools, or custom graphical user interfaces (GUIs)) may be implemented to enable clients to select pricing policies in the depicted embodiment. Some pricing policies may involve a flat fee per timestamp request, or a fee per client-API call. Another pricing policy may enable a client to reserve, for some up-front fee, a time server 112 or a specified number of timestamps from a time server 112 over a specified time period (e.g., for US$ X, the client may reserve 100,000 timestamps, to be provided during a week). In some implementations, tiered pricing may be supported, in which the price per timestamp and/or per API call may vary based on how many requests are made—for example, the client may be required to pay, in a given billing cycle, $X per timestamp for up to 100,000 timestamps, $Y per timestamp for the next 100,000 timestamps, $Z per timestamp for any timestamps beyond 200,000, and so on. In some embodiments, a dynamic spot pricing policy for time service requests may be implemented, according to which the price per timestamp or per API call may vary dynamically based on supply and demand, and the client may be required to bid for timestamps; bids may be accepted if they are no less than the current spot price, and rejected if they are below the current spot price, for example. In some embodiments, pricing policies may tie billing amounts to resource consumption levels at the time servers and/or endpoints—e.g., metrics may be kept for how much CPU usage, network traffic and/or other resources are consumed by the time service, and clients may be charged accordingly. In one embodiment, prices for timestamp generation and/or endpoint instantiation may be based on achieved response times—e.g., a client may have to pay less if a given request takes longer time than a specified threshold. Various combinations of pricing policies such as those listed here may be offered in some embodiments, allowing clients substantial flexibility in managing their time service budgets.

In the embodiment illustrated in FIG. 9, the time service may receive an indication of the pricing policy selected by a client (element 906) via one of the programmatic interfaces. A billing amount for the client's use of the time service may be determined, based on the selected pricing policy and on various metrics regarding the client's requests to and usage of the service (element 910). An indication of the billing amount for the time service may be provided to the client (element 914), e.g., as a line item on a more comprehensive bill for the use of various services of the provider network during a given billing period.

It is noted that in various embodiments, some of the operations shown in the flow diagrams of FIG. 6, 7, 8 or 9 may be omitted or performed in a different order than that shown, or may be performed in parallel rather than serially.

Use Cases

The techniques described above, of providing secure timestamps and customizable time service endpoints may be useful in a variety of different scenarios. For example, in environments where a certification of the precise time at which a particular document or transaction record was transmitted is critical, such as in the financial industry or in tax-related services, the ability to use tamper-proof time servers for high-quality timestamp generation may be critical. Security application providers may also be able to utilize the time service for various types of encryption-related operations.

Since the provider network implementing the service may be responsible for scaling the time service as the workload grows, securing transmissions of data between various components of the service, ensuring a high level of availability, and upgrading hardware/firmware/software for the service as needed, much of the infrastructure management overhead associated with in-house time service appliances may be avoided. In addition, because the provider network may be able to amortize the costs of the time servers and endpoints across large user populations, the costs of the time service may often be much more reasonable than those of alternative in-house systems within the clients' own networks.

Illustrative Computer System

Figure 10:
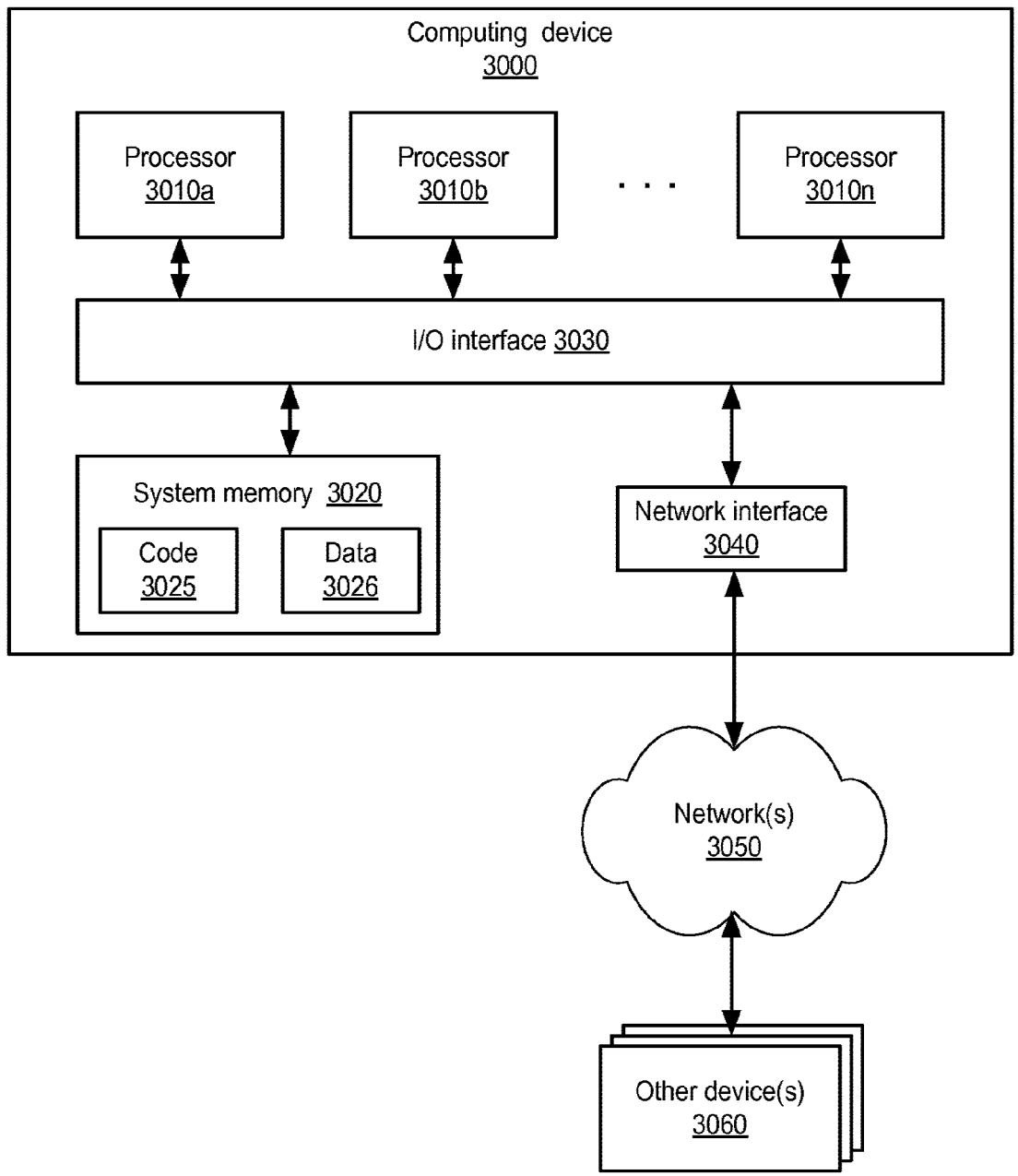
FIG. 10 is a block diagram illustrating an example computing device that may be used in at least some embodiments.

In at least some embodiments, a server that implements a portion or all of one or more of the technologies described herein, including the techniques to implement the time servers, endpoints and coordinator, may include a general-purpose computer system that includes or is configured to access one or more computer-accessible media. FIG. 10 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 9. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modi-

What is claimed is:

1. A system, comprising:
a time server; and
a service endpoint to respond to requests formatted according to one or more application programming interfaces (APIs) supported by a service implemented at a provider network, the service endpoint configured to:
receive a client request for a secure timestamp from a client of the service, the request comprising an indication of one or more timestamp properties and a data object for encryption by the time server, wherein the one or more timestamp properties comprise at least one of a requested timestamp precision, accuracy, or latency requirement;
send, to the time server, a timestamp request comprising a representation of at least a portion of the request, the representation comprising the one or more timestamp properties and the data object;
receive, from the time server, an encrypted response comprising an encryption of (a) the data object included in the request and (b) a timestamp value from the time server generated in accordance with the one or more timestamp properties; and
transmit, to the client, the encrypted response.

2. The system of claim 1, wherein the time server comprises a cryptographic engine, a time source, and a cryptographic key.

3. The system of claim 2, wherein the time server is configured to generate and send the encrypted response to the service endpoint in response to receiving the representation of at least a portion of the request.

4. The system of claim 1, wherein the service endpoint is further configured to:
receive, from a second client, an instantiation request to instantiate a second service endpoint; and
initiate an instantiation of the second service endpoint responsive to the instantiation request.

5. The system of claim 4, wherein the instantiation request indicates a category, and wherein the second service endpoint is instantiated in accordance with the indicated category.

6. The system of claim 4, wherein the second service endpoint is configured with a network address of a private network associated with the second client, wherein the private network comprises a plurality of resources of the provider network, and wherein the network address is indicated in the instantiation request.

7. A method, comprising:
instantiating (a) a time server and (b) a service endpoint to respond to requests formatted according to one or more application programming interfaces (APIs) supported by a service implemented at a provider network;
receiving a client request for a secure timestamp from a client of the service, the request comprising an indication of one or more timestamp properties and a data object for encryption by the time server, wherein the one or more timestamp properties comprise at least one of a requested timestamp precision, accuracy, or latency requirement;
sending, to the time server, a timestamp request comprising a representation of at least a portion of the request, the representation comprising the one or more timestamp properties and the data object;
receive, from the time server, an encrypted response comprising an encryption of (a) the data object included in the request and (b) a timestamp value from the time server generated in accordance with the one or more timestamp properties; and
transmitting, to the client, the encrypted response.

8. The method of claim 7, further comprising:
receiving, from a second client, an instantiation request to instantiate a second service endpoint; and
initiating an instantiation of the second service endpoint responsive to the instantiation request.

9. The method of claim 8, wherein the instantiation request comprises identification metadata, and wherein the second service endpoint is configured to include at least a portion of the identification metadata in responses provided by the second service endpoint.

10. The method of claim 7, wherein the time server comprises a cryptographic engine, a time source, and a cryptographic key.

11. The method of claim 10,
wherein the timestamp value is generated using output from the time source;
wherein the encrypted response is generated by the cryptographic engine using the cryptographic key.

12. The method of claim 7, further comprising:
configuring the service endpoint with a network address accessible from the public Internet.

13. The method of claim 7, further comprising:
configuring the service endpoint with a private network address accessible only from a portion of the provider network.

14. A non-transitory, computer-readable storage medium storing instructions that, when executed by one or more processors, cause the one or more processors to:
implement an application programmatic interface defined by a service implemented at a provider network;
receive, via the application programmatic interface, a client request for a secure timestamp from a client of the service, the request comprising an indication of one or more timestamp properties and a data object for encryption by the time server, wherein the one or more timestamp properties comprise at least one of a requested timestamp precision, accuracy, or latency requirement;
send, to the time server, a timestamp request comprising a representation of at least a portion of the request, the representation comprising the one or more timestamp properties and the data object; and
in response to receiving, from the time server, an encrypted response comprising an encryption of (a) the data object indicated in the request and (b) a timestamp value from a time server of the service generated in accordance with the one or more timestamp properties, transmit, to the client, the encrypted response.

15. The non-transitory, computer-readable storage medium of claim 14, wherein the instructions further cause the one or more processors to:
receive, from a second client, an instantiation request to instantiate a second service endpoint; and
initiate an instantiation of the second service endpoint responsive to the instantiation request.

16. The non-transitory, computer-readable storage medium of claim 14, wherein the instructions further cause the one or more processors to:
determine whether the time server has failed or has become unresponsive; and based on a determination that the time server has failed or has become unresponsive, identify a second time server, wherein the time server and the second time server are configured as a failover pair within an availability container.

17. The non-transitory, computer-readable storage medium of claim 16, wherein the instructions further cause the one or more processors to:
transmit, to the second time server, the representation of at least the portion of the request; and
receive, from the second time server, the timestamp value generated based at least in part on output from a time source of the second time server.

18. The non-transitory, computer-readable storage medium of claim 16, wherein the time server and the second time server share a cryptographic key.

19. The non-transitory, computer-readable storage medium of claim 14, wherein the instructions further cause the one or more processors to:
determine a quantity of additional time servers and corresponding locations of the additional time servers, based at least in part on a simulation model, an analytic model, quality-of-service requirements, or any combination thereof; and
instantiate the additional time servers in accordance with the quantity and the locations of the additional time servers.

20. The non-transitory, computer-readable storage medium of claim 14, wherein the encrypted response further comprises response metadata indicating branding information.

* * * * *